United States Patent [19]

Letsch et al.

[11] Patent Number: 4,754,888
[45] Date of Patent: Jul. 5, 1988

[54] VACUUM CARAFE

[75] Inventors: Klaus R. Letsch; Michael C. Letsch, both of Osterskär, Sweden

[73] Assignee: S.A.P. Scandinavian American Partnership, Camarillo, Calif.

[21] Appl. No.: 871,866

[22] Filed: Jun. 9, 1986

[30] Foreign Application Priority Data

Sep. 24, 1985 [SE] Sweden .................... 8504414

[51] Int. Cl.$^4$ .................... A47J 41/02; B65D 47/06
[52] U.S. Cl. .................... 215/12.1; 215/314; 215/364; 220/425; 222/552; 222/566
[58] Field of Search ............ 215/12 A, 13 R, 13 A, 215/314, 364, 309, 12.1, 12.2, 13.1; 222/465.1, 552, 554, 183, 566; 99/323, 306; 220/421, 425

[56] References Cited

U.S. PATENT DOCUMENTS

| | | |
|---|---|---|
| 2,599,332 | 6/1952 | Kirman .................... 215/13 A X |
| 2,946,491 | 7/1960 | Bramming ................ 215/13 A X |
| 3,070,250 | 12/1962 | Bramming ................ 215/13 A |
| 3,140,799 | 7/1964 | Mehr ........................ 222/465.1 X |
| 3,355,045 | 11/1967 | Douglas .................... 215/13 R |
| 3,561,632 | 2/1971 | Shirae ...................... 215/314 X |
| 3,776,433 | 12/1973 | DeTreitas ................ 215/13 A X |
| 3,785,539 | 1/1974 | Wetterek .................. 222/552 |
| 4,121,730 | 10/1978 | Dammer .................. 215/314 X |
| 4,625,884 | 12/1986 | Zimmermann .......... 215/13 A X |
| 4,630,742 | 12/1986 | Miyaji et al. ............ 215/13 R |

FOREIGN PATENT DOCUMENTS 3406918  9/1985  Fed. Rep. of Germany .... 215/13 R

Primary Examiner—William Price
Assistant Examiner—Sue A. Weaver
Attorney, Agent, or Firm—Harris, Kern, Wallen & Tinsley

[57] ABSTRACT

A thermos carafe with an inner container surrounded by a casing, whereby the inner container and the casing at the top have an opening which can be closed by a plug. The plug and/or the opening are shaped in such a way that it is possible to fill and empty the inner container, while the plug is left in the opening.

1 Claim, 2 Drawing Sheets

VACUUM CARAFE

BACKGROUND OF THE INVENTION

The present invention relates to carafes of the kind used for keeping coffee hot, and in particular to a new and improved vacuum carafe which can be used with a coffee-maker and which does not require a source of heat.

The existing kinds of vacuum carafes are primarily used in homes and for outdoor purposes, whereas offices, restaurants, etc., mostly use glass carafes kept warm on burners or electric heaters for making coffee. The existing vacuum carafes cannot in their present form be used directly with the type of coffee-maker that has the above-mentioned glass carafes. The coffee must first be prepared in a glass carafe and then poured into a vacuum carafe, if the coffee is to remain hot without continuous heating on a burner. Such vacuum carafes are often referred to as Thermos carafes.

There are several reasons why many restaurants and offices would prefer to make the coffee directly in a vacuum carafe. One reason is that coffee retains its taste and flavor better in a vacuum carafe than in a continuously heated glass carafe. Another reason is that there would be not need for burners or other sources of heat and that the coffee-maker could be manufactured without a carafe heat source, which would result in a simpler and less expensive device. A further reason is that a vacuum carafe can be brought to the place where the coffee is to be served and, once there, will maintain its serving temperature without any need for a heater. The fire hazard that exists when burners are used, is also eliminated. Evaporation from a continuously heated glass carafe and the ensuing concentration of coffee in the carafe are also eliminated.

The substitution of an ordinary vacuum carafe for the previously used glass carafe might seem to be a simple solution to this problem. However, this is not a good solution because of some inherent problems. If the use of the vacuum carafe is to be practical, it should not be necessary to remove the plug from the opening of the vacuum carafe before the brewing process and to put it back after completion of the brewing to maintain the temperature of the coffee, as is the case with an ordinary vacuum carafe. Furthermore, the vacuum carafe should be constructed in such a way that there be no overflowing of coffee in case someone should forget to remove the plug from the vacuum carafe before starting the brewing process. In addition, no complicated motions should be necessary for the serving of coffee.

The purpose of the present invention has therefore been to create a vacuum carafe which can be used for brewing from a coffee-maker directly into the carafe, which carafe at the same time does not require any manipulation or adjustment prior to or during brewing or during pouring.

SUMMARY OF THE INVENTION

A vacuum carafe with an inner container enclosed in a casing and an opening at the top. A plug for closing the opening, with the plug and opening shaped so that the container can be filled and emptied without moving the plug. A plug and container with mating grooves providing opposed flow paths into and out of the container, with one flow path serving as a coffee passage and the other serving as an air passage. A container preferably with a basin around the top for receiving coffee from a coffee-maker and a plug with openings for providing a flow path from the basin into the container.

DESCRIPTION OF THE PREFERRED EMBODIMENT

The vacuum carafe of the invention has an exterior shape made to fit the coffee-makers currently found on the market, typically with a brewing volume of approximately 1.8 liter (60 fl. oz). Thus the carafe has an exterior shape and an interior volume which approximately correspond to the glass carafes of the current coffee-makers.

Figure 1:
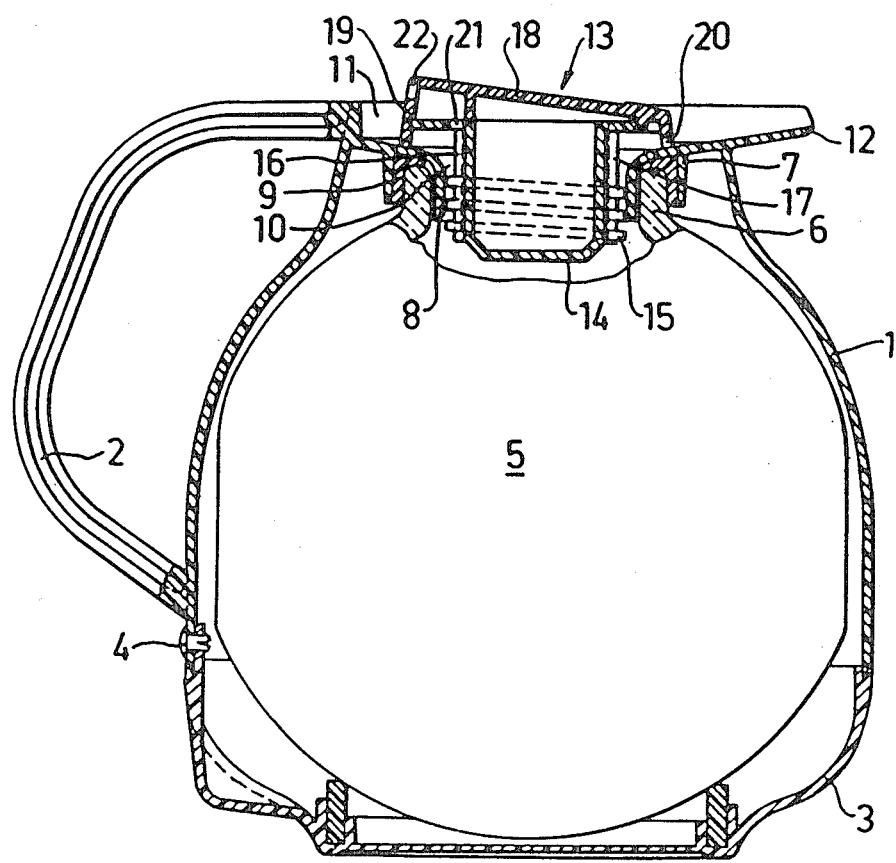
FIG. 1 is a side view partly in section showing a vacuum carafe incorporating the presently preferred embodiment of the invention.
Figure 2:
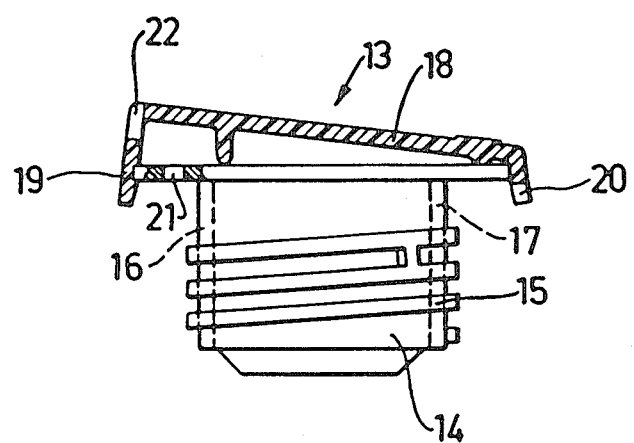
FIG. 2 is an enlarged partial sectional view of the plug of the vacuum carafe of FIG. 1.

The preferred embodiment of the vacuum carafe shown in FIGS. 1 and 2 has a casing of plastic consisting of an upper part 1 with an integrated handle 2, and a lower part 3. In order to save space, the lower part 3 is riveted to the upper part 1 by means of plastic rivets 4. Within the casing, there is, as usual, an inner container 5 with a neck portion 6. The inner container 5 should preferably be a traditional double-walled, silverplated glass receptacle.

The upper part of the casing 1 has two ring-shaped flanges 7 and 8, protruding downwards and surrounding the neck portion 6 of the inner container. An opening 10 into the interior of the inner container 5 is defined by the inner flange 8. The neck portion 6 is, as customary, made tight against the flanges 7 and 8 by means of a rubber seal. The inner flange 8 has integral screw threads along certain sections on its inner wall. The upper part 1 of the casing is shaped so as to create a mainly ring-shaped basin 11 around the opening 10, with a spout 12 opposite the handle 2.

A plug 13 is used for closing of the opening 10 of the vacuum carafe. This plug 13, also preferably made of plastic, has a body 14 which on the outside has screw threads 15 for engagement with the screw threads of the inner flange 8 at the opening 10. The screw threads 15 of the plug body are broken by axial grooves 16 and 17 along the body of the plug. Typically the grooves 16, 17 are diametrically opposite each other. Grooves are provided in the screw threads of the inner flange 8 to cooperate with the grooves 16 and 17 of the plug to define flow paths between the basin 11 and the interior of the container 5.

The plug 14 has a lid 18, which slopes towards the spout 12 when the plug is screwed into the opening. The lid 18 has a lower rim or edge 19 which serves as a seal against the bottom of the basin 11 in the upper part of the casing, around the greater part of the opening. In the lower part of the edge 19, there is an outlet 20 disposed adjacent the spout 12 when the plug is screwed in. This outlet 20 is then adjacent the axial groove 17 in the screw threads of the plug and the section without screw threads on the inner wall of the inner flange 8. A hole 21 in the plug adjacent the groove 16 and an opening 22 at the back of the lid provide an air passage for flow of air to and from the interior of the inner container 5. The screw threads on the inner flange 8 and the plug 13 are shaped in such a way that the plug 13, when completely screwed into the opening 10, has the outlet 20 aligned with the spout 12.

The vacuum carafe of the invention is intended for use directly in a coffee-maker, with the vacuum carafe placed under the brewing funnel of the coffee-maker in such a way that the coffee jet coming from the brewing funnel falls onto the sloping lid 18 of the plug. The coffee then flows into the basin 11, through the outlet 20 and the path formed by the axial groove 17 and the section without screw threads on the flange 8, into the interior of the inner container. The size of the outlet 20 and the flow paths defined by the groove 17 are designed for receiving the quantity of coffee that the coffee-maker produces, with the basin 11 serving to level out small variations in flow rates. When the coffee flows into the container, the air inside the inner container 5 is simultaneously pressed out through the air passage formed by the axial groove 16, the hole 21 and the opening 22. Were it not for this air passage, the pressure inside the inner container would increase so that the air, in the form of bubbles, would force itself out the same way the coffee flows in, which would cause splashing around the vacuum carafe and overflowing of the coffee through the spout 12 due to increased quantity of coffee in the basin 11.

When the coffee is being served, it is not necessary to remove the plug. The coffee comes out the same way it entered when the vacuum carafe is tilted. The air then enters the inner container through the air passage of the groove 16, so that no underpressure is created. A further advantage with the air passage is that the absence of any overpressure, existing in traditional vacuum carafes, makes the coffee keep its flavor in a way not possible when there is an overpressure in the inner container.

With the plug described above, allowing in- and outflow of coffee to and out of the inner container without removal of the plug, a sufficient serving temperature can be maintained for at least four hours, which should be enough in most cases, although the carafe in continuously open for pouring. If it is desired to have the coffee remain hot for a longer period of time, another plug can be used to close the carafe completely.

We claim:

1. A vacuum carafe having an inner container surrounded by a casing and an opening at the top; and a plug for closing said opening, with said plug and opening having interengaging means shaped in such a way that said inner container can be filled and emptied while said plug is left in said opening;

with said plug and opening defining a fluid flow passage between the interior of said inner container and the exterior of the carafe, making it possible to fill and empty the carafe while the plug is left in the opening, and with said casing around said opening having the shape of a basin, and said plug having a lid with a downwards protruding edge engaging said basin to provide a seal around the greater part of the opening, with an outlet in said edge aligned with said passage, and with said lid having a sloping upper surface, inclining down towards said outlet.

* * * * *